(12) United States Patent
Yamazaki

(10) Patent No.: US 11,537,342 B2
(45) Date of Patent: Dec. 27, 2022

(54) DEVICE MANAGEMENT DEVICE, METHOD, AND STORAGE MEDIUM

(71) Applicant: CANON KABUSHIKI KAISHA, Tokyo (JP)

(72) Inventor: Daisuke Yamazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/364,983

(22) Filed: Jul. 1, 2021

(65) Prior Publication Data

US 2022/0011995 A1  Jan. 13, 2022

(30) Foreign Application Priority Data

Jul. 7, 2020 (JP) .............................. JP2020-117354

(51) Int. Cl.
 G06F 3/12 (2006.01)
 H04N 1/34 (2006.01)
 H04N 1/32 (2006.01)

(52) U.S. Cl.
 CPC .......... G06F 3/1268 (2013.01); G06F 3/1204 (2013.01); G06F 3/1231 (2013.01); G06F 3/1267 (2013.01); H04N 1/32101 (2013.01); H04N 1/346 (2013.01)

(58) Field of Classification Search
 None
 See application file for complete search history.

(56) References Cited

U.S. PATENT DOCUMENTS

| 10,892,904 B2 * | 1/2021 | Miyamoto | .............. H04W 4/24 |
| 2019/0079714 A1 * | 3/2019 | Kawanishi | ........... G03G 15/553 |
| 2021/0065101 A1 * | 3/2021 | Nagayama | ......... G06Q 10/0838 |

FOREIGN PATENT DOCUMENTS

JP  2016164720 A  9/2016

* cited by examiner

*Primary Examiner* — Frantz Bataille
(74) *Attorney, Agent, or Firm* — Rossi, Kimms & McDowell LLP

(57) ABSTRACT

Management is performed by using a contract number, a model, a device ID, and data for managing the number of printed sheets as the contract device, a task for acquiring information necessary for management as the contract device is generated in response to a detection of a new device corresponding to a contract, a device search is performed via a network, and information necessary for management as the contract device is acquired from a new device according to the task in response to a detection if the new device corresponding to a model managed as the contract device is detected by the search. Additionally, a device ID of the contract device and data for managing the number of printed sheets are updated and managed by using the information acquired from the new device in response to the detection of the new device.

9 Claims, 19 Drawing Sheets

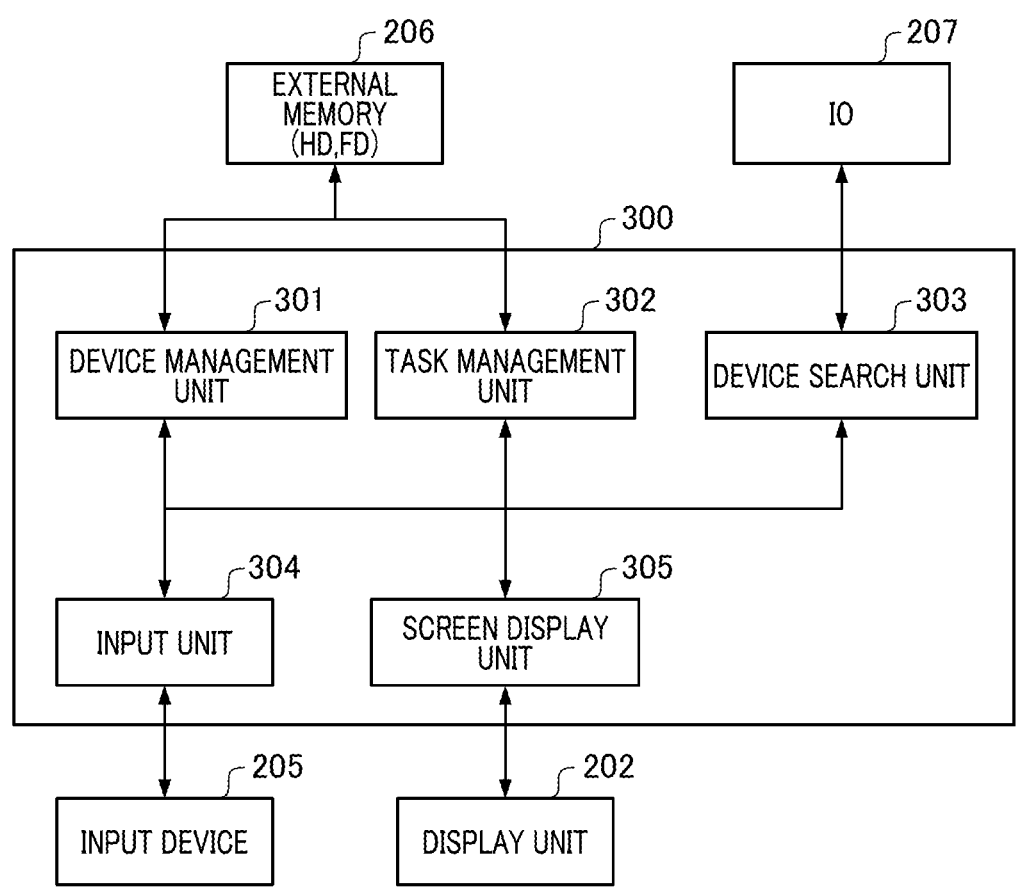

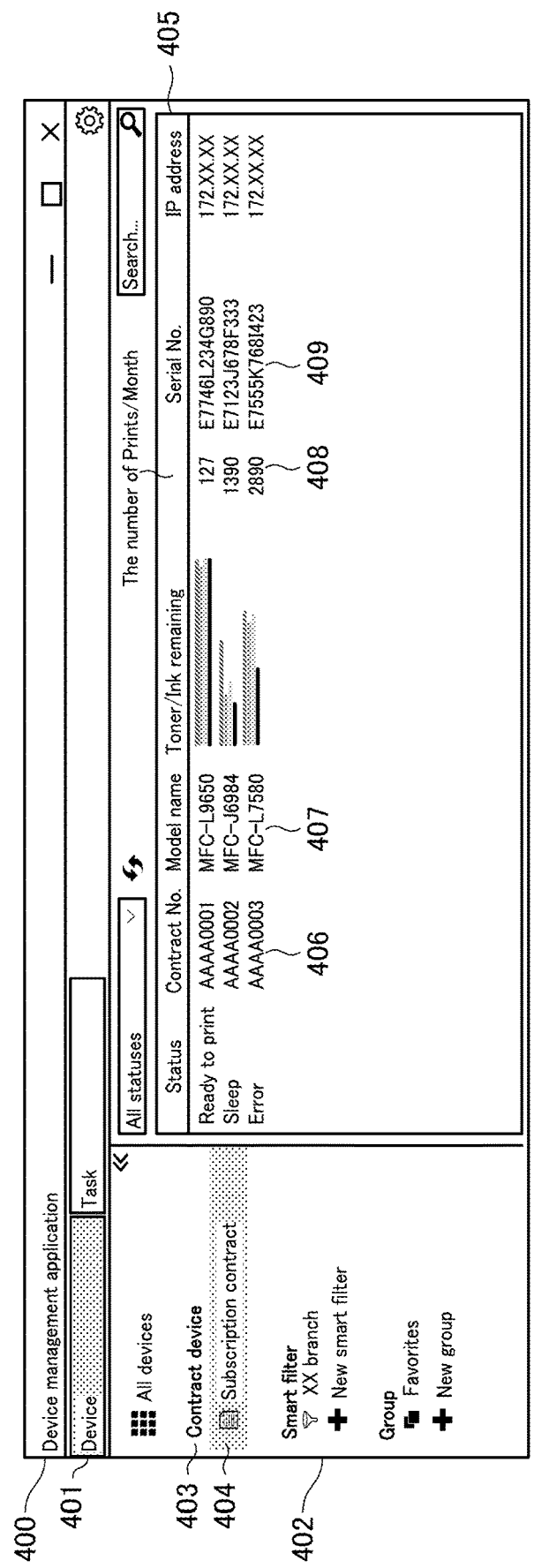

FIG. 6

```
{
  "devices":
  [
    {
      "serial_number": E7746L234G890,
      "model_name": "MFC-L9650",
      "prints": 6899,
      "node_name": "MFC-L9650_003",
      "ip_address": 172.XX.XX.X1,
      "contract_type": 1,
      "contract_number": "AAAA0001",
      "monthly_prints": 127
    },
    {
      "model_name": "MFC-J6984",
      "prints": 8897,
      "monthly_prints": 1390,
      "node_name": "MFC-J6984_3F_02",
      "ip_address": 172.XX.XX.X1,
      "contract_type": 1,
      "contract_number": "AAAA0002",
      "serial_number": E7123J678F333,    },
    {
      "model_name": "MFC-L7580",
      "base_prints": 26899,
      "monthly_prints": 2890,
      "node_name": "MFC-L7580_001",
      "ip_address": 172.XX.XX.X3,
      "contract_type": 1,
      "contract_number": "AAAA0003",
      "serial_number": E7555K768I423,    },
    {
      "serial_number": E6343D221554,
      "model_name": "MFC-G4550",
      "base_prints": 36899,
      "node_name": "MFC-G4550_001",
      "ip_address": 172.XX.XX.X4,
    }
      ...
  ],
}
```

- 501: outer `{ }`
- 502: `[ ]`
- 503: inner `{ }`
- 504: serial_number
- 505: model_name
- 506: prints
- 507: node_name
- 508: ip_address
- 509: contract_type
- 510: contract_number
- 511: monthly_prints

DEVICE MANAGEMENT DEVICE, METHOD, AND STORAGE MEDIUM

BACKGROUND OF THE INVENTION

Field of the Invention

The present invention relates to a device management device, a method, and a storage medium.

Description of the Related Art

In recent years, the number of subscription contracts that allow a user to use a device, for example, a printer and an MFP (Multi-Function Peripheral) for a predetermined term by a payment of predetermined flat rate, is increasing. Typically, a subscription contract is made for each device, and the user can use the device by a payment, of a flat rate unless the number of printed sheets exceeds an upper limit for the term determined in the subscription contract. For example, in a monthly contract, if the number of printed sheets per month does not exceed an upper limit, the device can be used by paying a flat rate. Excess charges are paid only when the number of printed sheets exceeds the upper limit, and consumables such as a toner are automatically delivered free of charge when the remaining amount of toner is low. In contrast, a method has been proposed for transferring the data of a device to a replacement device when a user cannot operate the device due to a device failure or the like (refer to Japanese Patent Laid-Open Publication No. 2016-164720).

When the device is used under a subscription contract as described above, the user's interest is not the number of printed sheets per device, but the number of printed sheets per contract (for example, in a monthly contract, the number of printed sheets per month). Hence, when the device is replaced due to a device failure or the like, it is desirable that the number of printed sheets can be confirmed per contract even after the device is replaced.

However, conventionally, the use of such a subscription contract has not been considered, and only the number of printed sheets is taken over between devices. For example, the management of the number of printed sheets according to the subscription contract cannot be performed, and there is a capacity for improvement in the management of the device according to the contract.

SUMMARY OF THE INVENTION

The present invention has been made considering the above problems, and it is an object of the present invention to improve the management of a device according to a contract.

A device management device according to an embodiment of the present invention comprises: a management unit that manages a network device capable of communicating via a network as a contract device by using a contract number, a model, a device ID, and data for managing the number of printed sheets as the contract device; a generating unit that generates a task for acquiring information necessary for management as the contract device in response to a detection of a new device corresponding to a contract; a search unit that searches a device via a network; and an acquisition unit that acquires information necessary for management as the contract device from a new device according to the task in response to a detection when the new device corresponding to a model managed as the contract device is detected by the search, wherein the instruction causes the device management apparatus to update and manage a device ID of the contract device and data for managing the number of printed sheets by using the information acquired from the new device in response to the detection of the new device.

Further features of the present invention will become apparent from the following description of exemplary embodiments (with reference to the attached drawings).

BRIEF DESCRIPTION OF THE DRAWINGS

FIG. 3 illustrates an example of at software configuration of a device management application 300 according to the first embodiment or the present invention.

FIG. 4A and FIG. 4B illustrate an example of a GUI 400 of the device management application according to the first embodiment of the present invention.

FIG. 6 illustrates an example of the data structure of device information 501 according to the first embodiment of the present invention.

DESCRIPTION OF THE EMBODIMENTS

The best mode for carrying out the present invention will be described below with reference to the drawings.

First Embodiment

System Configuration

Figure 1:
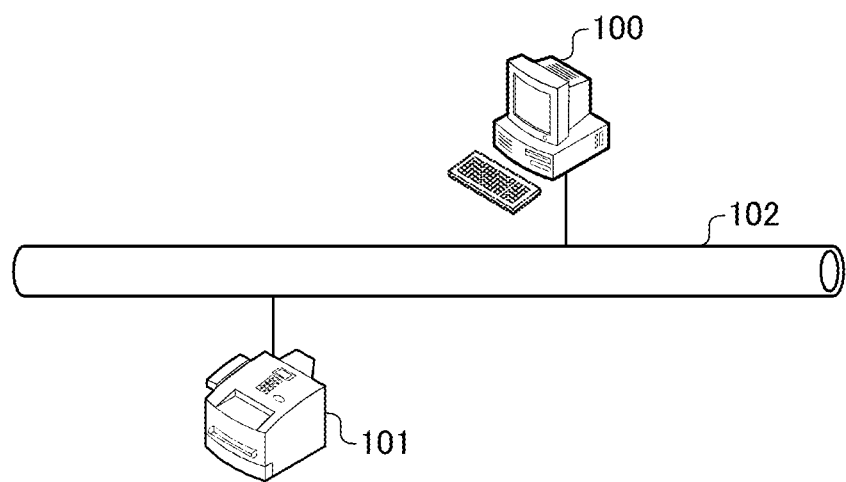
FIG. 1 illustrates the overall configuration of as system according to the first embodiment of the present invention.

FIG. 1 illustrates the overall configuration of a system according to the first embodiment of the present invention. The present embodiment shows a device management system including a device management apparatus according to the present invention. The device management system shown in FIG. 1 includes a PC 100, a device 101, and a LAN 102, and the PC 100 and the device 101 are communicatively connected to each other via the LAN 102. "PC" is an abbreviation for "Personal Computer". "LAN" is an abbreviation for "Local Area Network". The PC 100 is an example of a device management apparatus. The device 101 is an example of a contract device for which a contract, such as a subscription contract, has been made. The device 101 is an example of a network device that can communicate via a network.

The PC 100 is an example of an information processing apparatus, in which a predetermined OS (not illustrated) is stalled. In addition, a driver program (not illustrated) for instructing the device 101 to print or fax, and various application programs (not illustrated) for executing specific function processing, are installed in the PC 100. The specific functional processing includes document processing, spreadsheet processing, presentation processing, image processing, and graphic processing. These programs are not essential and installation on the PC 100 is not required.

The device management application 300 (to be described below) is installed on the PC 100. The device management application 300 acquires the status information of the device 101 connected to the PC 100 from the device 101, and displays the status information by a GUI (Graphical User Interface) of the device management application 300 to be described below. "GUI" is an abbreviation for "Graphical User Interface". The status information of the device 101 refers to information such as an apparatus status indicating printability, occurrence status of warning/error and the like, the remaining amount of each color toner loaded in the device 101, and the number of printed sheets indicating the total number of printed sheets printed by the device 101.

The device 101 is an example of an image forming apparatus, for example, a printer and an MFP, and includes functions such as a printing function, a FAX function, a copying function, a scanner function, and a file transmission. The device 101 executes output processing such as printing in accordance with an instruction from the PC 100. Note that the device 101 may be composed of a plurality of devices, each of which may communicate, with the PC 100.

Hardware Configuration of Information Processing Apparatus

Figure 2:
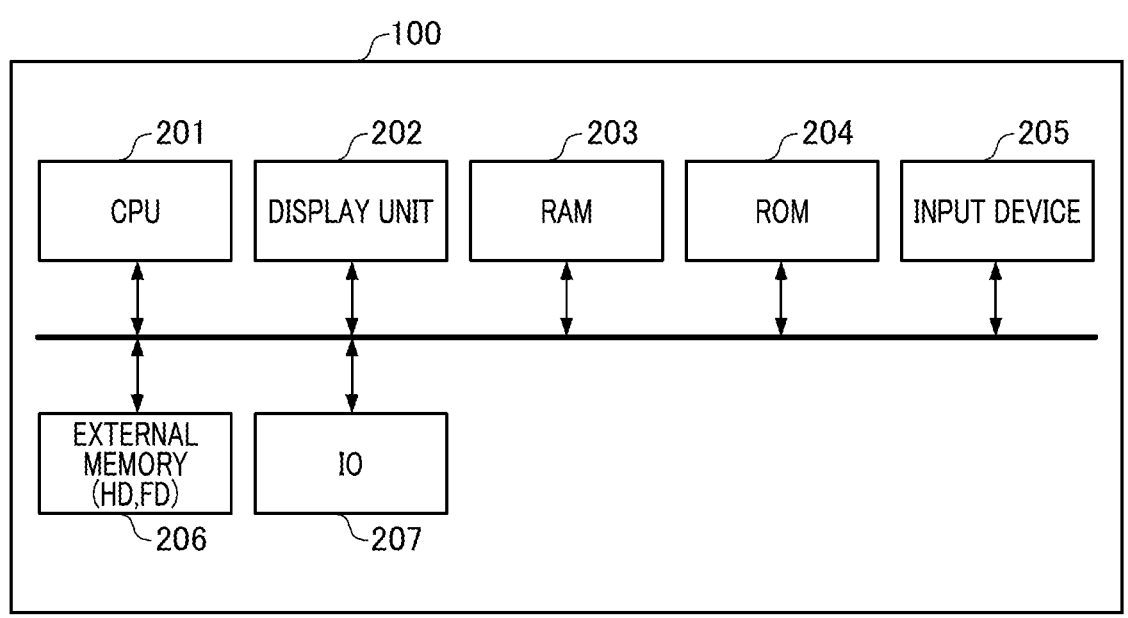
FIG. 2 is block diagram illustrating an example of a hardware configuration of an information processing apparatus according to the first embodiment of the present invention.

FIG. 2 illustrates an example of the hardware configuration of the PC 100 shown in FIG. 1. In FIG. 2, the PC 100 includes an input device 205 that receives a user's operation input via, for example, a keyboard and a pointing device. The PC 100 also includes a display unit 202 that provides a user with visual output information feedback. The PC 100 also includes a RAM 203, an external memory 206, for example, an HDD and an FDD, and a ROM 204, which serve as storage devices for storing various programs and execution information in the present embodiment. "HDD" is an abbreviation for "Hard Disk Drive". "FDD" is an abbreviation for "Flexible Disk Drive". The PC 100 further includes an I/O 207, which is an interface device for communicating with an external device, and a CPU 201 for executing programs. "CPU" is an abbreviation for "Central Processing Unit". Note that the connection form with peripheral devices can be wired or wireless. The PC 100 is connected to the device 101 via the I/O 207.

Software Configuration

FIG. 3 illustrates as example of the software configuration of the device management application 300 of the PC 100. The device management application 300 includes a device management unit 301, a task management unit 302, a device search unit 303, an input unit 304, and a screen display unit 305.

Figure 5A:
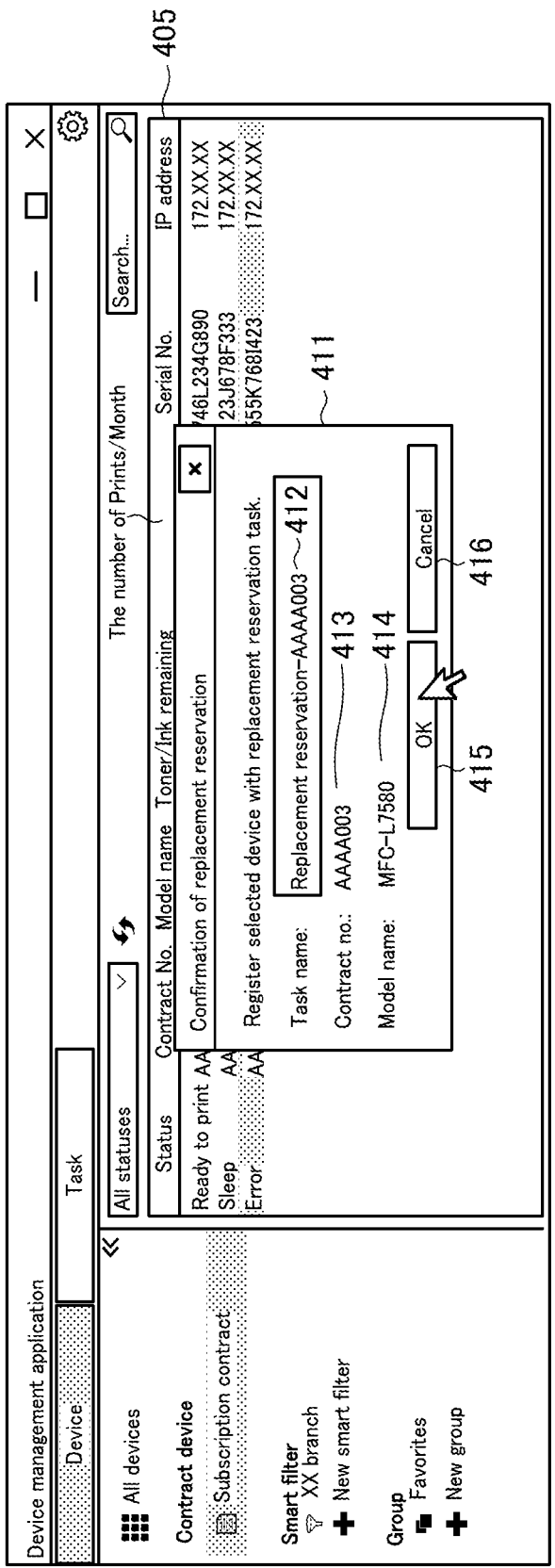
FIG. 5A and FIG. 5B illustrate an example of the GUI 400 of the device management application 300 according to the first embodiment of the present invention.
Figure 5B:
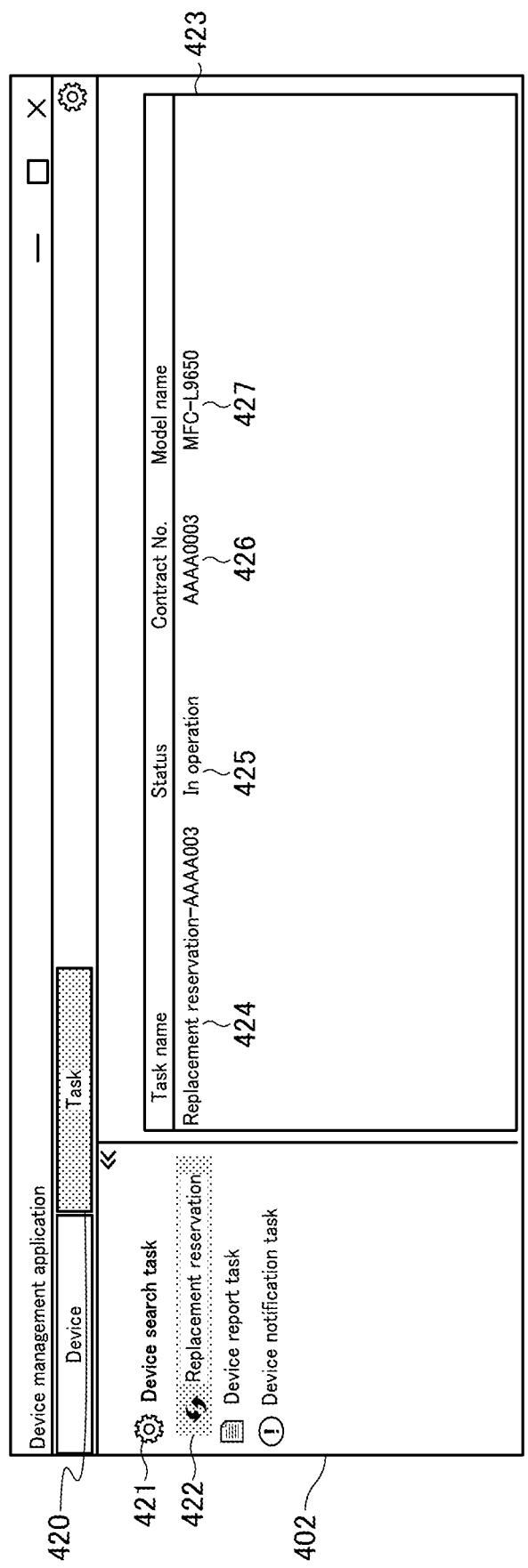

The device management unit 301 manages device information of the device 101 to be managed by the device management application 300. In this context, the device 101 to be managed indicates a device to be displayed on the device management device application 300, and is a device on the network found by a device search. The device search is executed by the device search unit 303 when the device management device application 300 starts or when an execution operation (not illustrated) by the user is received. The device management unit 301 stores the device information of the device 101 to be managed in the external memory 206 as a device information file to be described below (details are shown in FIG. 5A and FIG. 5B). The device management unit 301 is an example of a management means that manages the device 101 by using a contract number, a model, a device ID, and data for managing the number of printed sheets as a contract device.

The task management unit 302 manages the task information of a device search task. The device search task indicates a task process executed for a new device found by device search performed by the device search unit 303. The device search task defines filter conditions (for example, matching of the model names or serial numbers) for determining a target device. The device search task also defines the application processing (for example, incorporation of replacement device information, and incorporation of initial settings) to be executed when a device that matches the filter condition is found. The device search task is registered in advance by a user, the registered task information is stored in the external memory 206 by a task management unit 302 to serve as a task information file to be described below, and is then managed. The serial number is an example of a device ID. The task management unit 302 is an example of a generating means that generates a task for acquiring information necessary for management as a contract device, in response to the detection of a new device corresponding to the contract.

The device search unit 303 searches the device(s) 101 connected via a network 102 and executes a device search task on the device(s) that has been newly found (detected). The new device is a device found by the search and indicates a device that does not exist among the device(s) 101 managed by the device management unit 301. The device search unit 103 is an example of a search unit that searches a device via a network. The device search is processed in, for example, the following flow. The device search unit 303 transmits a broadcast packet of SNMPv1 (Simple Network Management Protocol version 1). The device 101 responds to the SNMPv1 request horn the device search unit 303. The device search unit 303 additionally acquires device information to be used by the device management application 300 from the device 101 to which a response has been returned. The device search unit 303 periodically acquires the device information including the number of printed sheets of the device body from the device 101 managed by the device management unit 301, and updates, the device information via the device management unit 301. The device information may be acquired by another means. For example, the device information may be reported from the device 101 side, or the device information may be collected by a separate server (not illustrated) that manages the device, and the device information may be acquired via the separate server.

The input unit 304 detects the user's operation for the input device 20 through the GUI of the device management application 300 displayed by the screen display unit 305, and obtains the information about the user's operation. The screen display unit 305 performs screen display control such as the display of the GUI of the device management application 300 and the receipt of the user's operation on the GUI GUI of Device Management Application FIG. 4A, FIG. 4B, FIG. 5A and FIG. 5B illustrate an example of the GUI 400 of the device management application 300. The GUI 400 display's the device information managed by the device management application 300 and the task information of the registered device search task. The GUI 400 displays the list of the device information managed by the device management application 300 in a device list 405 when the user selects a device tab 401. The GUI 400 also displays, in a navigation pane 402, filters and groups for specifying target to be displayed in the device list 405.

A contract device 403 is a filter for filtering the contracted devices, and when the subscription contract 404 is selected, a list of devices contracted for subscription is displayed in the device list 403. In addition, it may be possible to display a filter for performing filtering under a user's optional condition, a group that is grouped by the user's selection of the target devices, and the like. Note that the contract device 403 in the present embodiment is assumed to be registered in advance, and it may be registered by any registration means. The contract device 403 may be registered by the GUI 400 (not illustrated) or it may be registered by a task for registering contract devices (not illustrated) serving as a device search task.

The GUI 400 displays the lists of the target devices in the device list 405 according to the filter or the group selected in the navigation pane 402. The example of FIG. 4A shows a state in which the subscription contract 404 is selected in the navigation pane 402, and the devices to which a subscription contract has been made are listed. In the case of a device for which a subscription contract has been made, the device information displayed in the device list 405 includes a contract number 406 of the subscription contract, a model name 407 of the device, the number of printed sheets per month 408, and a serial number 409 of the device. By confirming these items of information, the user can confirm the list of contracted devices and the number of printed sheets per month for each device, and can confirm whether or not, in the usage status of the devices in the current month, the number of printed sheets is less than the limit number of printed sheets to which the contract has been made. The device list 405 may also display the device information including a device status, it remaining amount of toner, and an IP address.

Next, a description will be given of an operation example of the replacement reservation task in the GUI 400 of the device management application 300. For example, if a device needs to be replaced due to a failure or the like, the device is registered in the replacement reservation task, so that the information about the device can be automatically incorporated by the device search task after the device is replaced.

Figure 4B:
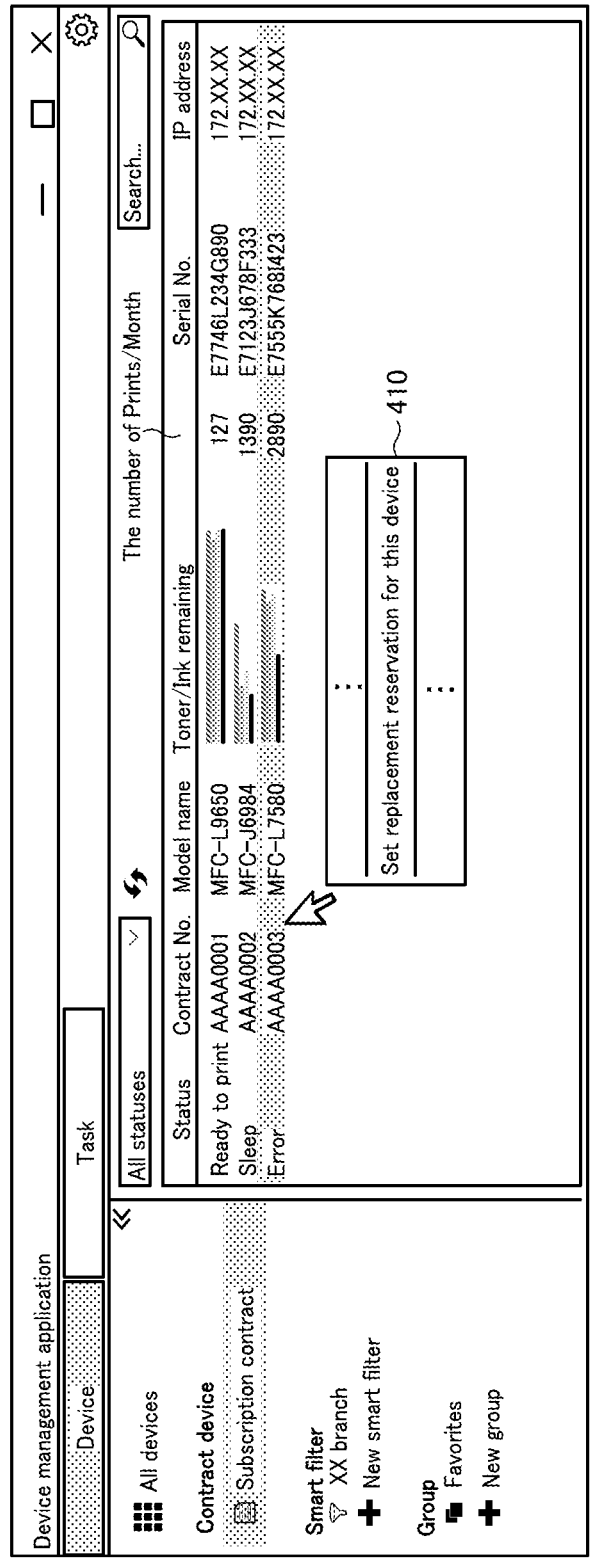

Upon receipt of the user's selection of the device on the device list 405, the GUI 400 displays a replacement reservation menu 410 (refer to FIG. 4B). When the user selects a replacement reservation menu from the replacement reservation menu 410, the device management application 300 registers the replacement reservation task of the device selected by the user from the device list 405, in the device search tasks. In the present embodiment, the GUI 400 displays a message 411 when the user selects the replacement reservation menu from the replacement reservation menu 410 (refer to FIG. 5A).

The message 411 is confirmation message of the replacement reservation. The message 411 includes a task name 412 of the replacement reservation task, a contract number 413 of the target device, and a model name 414 of the target device. The user can confirm the information contained in the message 411. When an OK button 415 is activated, the device management application 300 registers the replacement reservation task. When a cancel button 416 is activated, the device management application 300 cancels the registration of the replacement reservation task.

The user can confirm the replacement reservation task by selecting a task tab 420. When the user selects the task tab 420, the GUI 400 displays the list of the task information managed by the device management application 300 in a task list 423 (refer to FIG. 5B).

When the task tab 420 is selected, the GUI 400 displays a task name for specifying a task to be displayed in the task list 423 in the navigation pane 402. A device search task 421 indicates that the device search task is displayed in the task list 423. The device search task is a task processed during execution of a device search. In addition to the device search task, the GUI 400 may display a device report task for generating a periodic report of the device, a device notification task for providing a notification about device status information and error information and the like, in the navigation pane 402.

The replacement reservation task is an example of a task that is included in the device search task. When the user selects a replacement reservation task 422, the GUI 400 displays a replacement reservation task in the task list 423 out of the device search tasks registered in the device management application 300. In addition to the replacement reservation task, the device search task may include an initial setting task serving as a device search task. The task is displayed in the navigation pane 402, and when selected by the user, the task is displayed in the task list 423 from among device search tasks registered in the device management application 300.

When the user selects the replacement reservation task 422, the GUI 400 displays the task information on the task list 423. The task information includes a task name 424, a task status 425 (indicating a status, for example, the task is in operation and the task has stopped), a contract number 426 of the target device, and a model name 427 of the target device.

Data Structure (Device Information)

FIG. 6 illustrates an example of the data structure of the device information 501 managed by the device management application 300. The device information 501 comprises a device list 502 of devices managed by the device management application 300. The device list 502 comprises device information 503 of each device. The device information 503 includes a serial number 504, a model name 505, the number of base prints 506, a node name 507, an IP address 508, a contract type 509, a contract number 510, and the number of monthly prints 511.

The serial number 504 is a number uniquely assigned to individual devices, and the individual device can be identified by this value. The model name 505 indicates the model name of the device and indicates the type of the device. Devices having the identical values are treated as the same model, and they can be treated as devices having identical functions and specifications.

The number of base prints 506 indicates the total number of sheets printed in the past by the device. The device management application 300 periodically acquires the value of the number of base prints 506, and adds the increment to the number of monthly prints 511. Thus, the device management application 300 can total the number of printed sheets per month.

The node name 507 is information for the user to identify the individual device and indicates a name assigned by the user (the node name is optional, not essential). The IP address 508 is an IP address assigned to the device. In the acquisition of the number of base prints 506 and other status in from the device, the device management application 300 communicates with the device by using an address defined by the value of the IP address 508 as a communication destination. The contract type 509 is a value indicating the type of contract when the device is a contract device. In the contract type 509, a value is assigned for each type of contract. In a subscription contract, the contract type 509 is, for example, "1" indicating the type of contract. When the device is a contract device, the contract number 510 is a contract number of the device.

The number of monthly prints 511 is the number of printed sheets per month and, if the device is a contract device, the number of monthly prints 511 indicates the total number of sheets printed during the current month. For example, if the device contract is a monthly subscription contract, the device management application 300 resets the number of monthly prints 511 to "0" every month. The device management application 300 adds the increment of the number of base prints 506 acquired from the device to the number of monthly prints 511 to total the number of printed sheets per month.

Note that the contract type 509, the contract number 510, and the number of monthly prints 511 are information specific to the contract device, and if the device is not a contract device, the device management application 300 does not have such information as the device information.

The device information is stored in the external memory 206 of the PC 100 in JSON (Jaya Script (registered trademark) Object Notation) format. The device information may be stored as an XML (Extensible Markup Language) file or stored in an external database (not illustrated). The method and format for storing the device information are not limited in particular.

Data Structure (Task Information)

Figure 7:
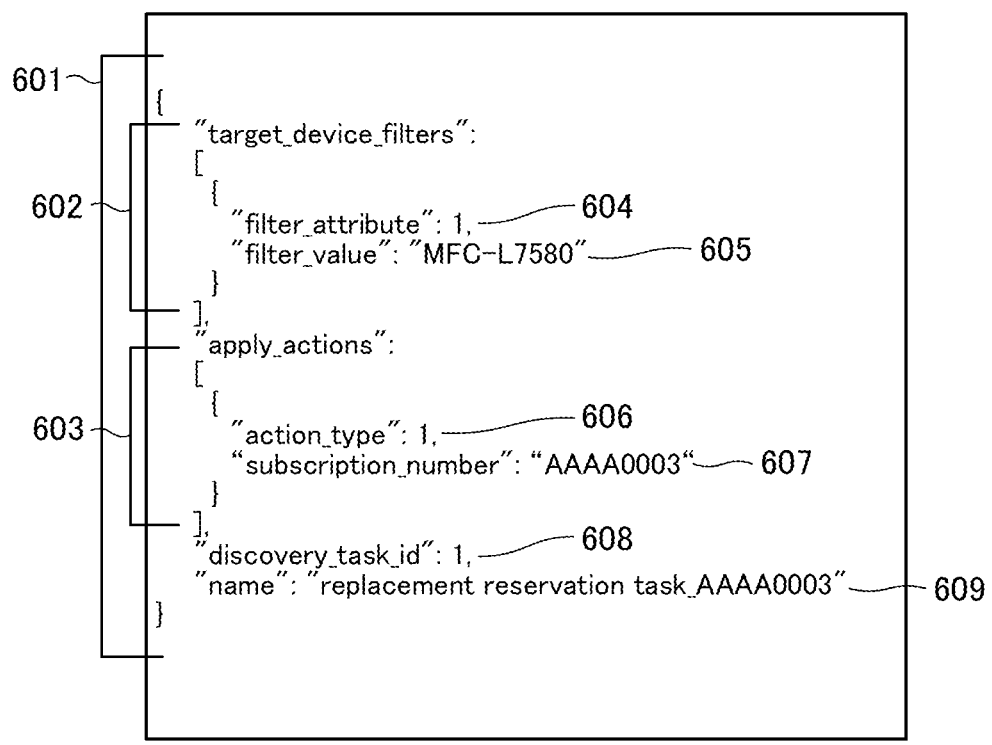
FIG. 7 illustrates an example of the data structure of task information 601 according to the first embodiment of the present invention.

FIG. 7 illustrates an example of the data structure of the task information 601 managed by the device management application 300. The task information 601 configured by a filter condition 602, an application processing 603, a device search ID 608, and a task name 609. The filter condition 602 is a condition for specifying a target device for task processing. The application processing 603 defines processing to be applied to the device when a device that matches the filter condition 602 is searched.

The filter condition 602 includes a filter attribute 604 and a filter value 605. When an attribute specified by the filter attribute 604 (a numerical value indicating a predetermined type for each attribute) matches the filler value 605, the device management application 300 regards the device as a device that matches the condition. Note that a condition expression may be defined so that the device is regarded to match the condition, including the case of "the attribute includes the filter value 605" or "the attribute starts from the filter value 605", in addition to the condition "the attribute matches the filter value 605".

The application processing 603 includes a processing type 606 and an attribute value 607. In the example of FIG. 7, "1", which indicates the replacement reservation, is defined as the processing type 606, and "AAAA0003", which indicates the contract number of the target for the replacement reservation, is defined as the attribute value 607.

The device search ID 608 indicates an ID uniquely assigned to a task registered as a device search task. The task name 609 indicates a name of the task specified by the user during task registration.

The task information is stored in the external memory 206 of the PC 100 in JSON format. Additionally, the task information may be stored as an XML format file or stored in an external database (not illustrated). The method and format for storing the task information are not limited in particular.

Registration Processing of Replacement Reservation Task

Figure 8:
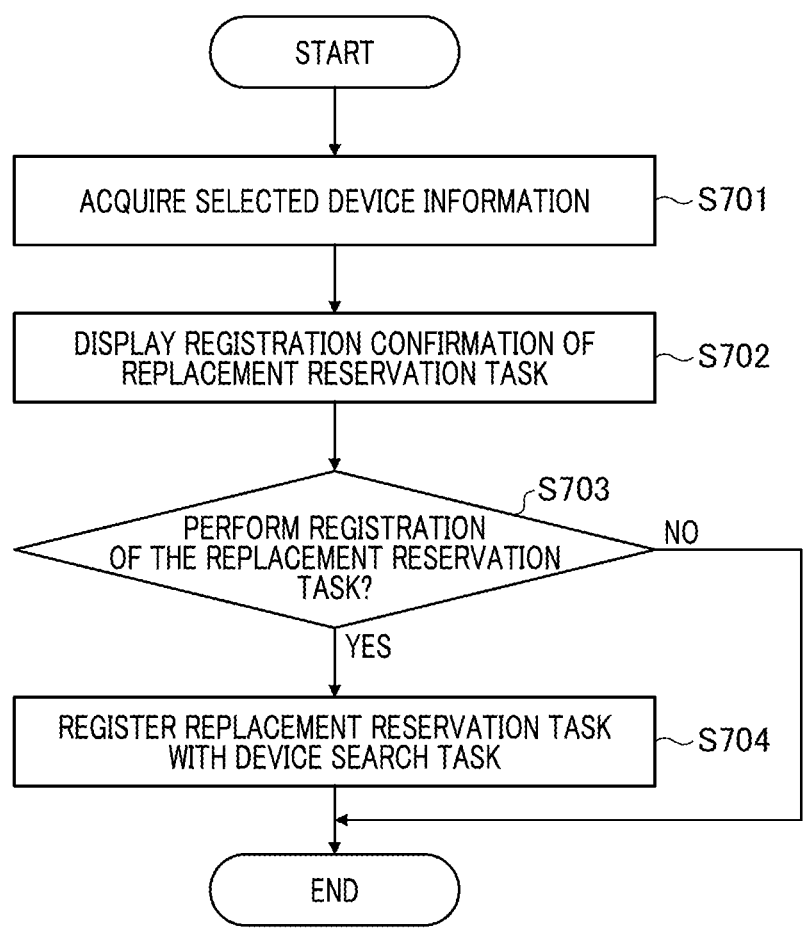
FIG. 8 is a flowchart illustrating an example of the registration processing procedure for a replacement reservation task according to the first embodiment of the present invention.

FIG. 8 is a flowchart illustrating an example of the registration processing procedure of the replacement reservation task of the device management application 300. Here, the process carried out when the user selects a device that is a target for replacement, and executes registration of the device in the replacement reservation ask by the GUI 400 shown in FIG. 4A, FIG. 4B, FIG. 5A and FIG. 5B is described. This process starts by receiving a user's operation on the screen display unit 305 through the input unit 304. The process described in this embodiment is performed by loading the program of the device management application 300 stored in ROM 204 or the external memory 206 into the RAM 203, and executing it by CPU 201.

In S701, the input unit 304 receives the user's registration operation of the replacement reservation task on the screen display unit 305, acquires the device information selected by the screen display unit 305, and instructs the task management unit 302 to register the replacement reservation task.

In S702, the task management unit 302 specifies the device information received from the input unit 304, and instructs the screen display unit 305 to display a registration confirmation message of the replacement reservation task. Specifically, the screen display unit 305 displays the message 411 of FIG. 5A. The screen display unit 305 specifies values of the received device information by the task name 412 (for example, "replacement reservation-<contract number>"), the contract number 413, and the model name 414, and displays them as the message 411.

In S703, the input unit 304 receives a user's operation in the registration confirmation message of the replacement reservation task via the screen display unit 305, and when the registration of the replacement reservation task is executed (that is, when the OK button 415 of FIG. 5A is activated), the process proceeds to S704. Here, when the registration of the replacement reservation task, is canceled (that is, when the cancel button 416 shown FIG. 5B is activated), the input unit 304 does not execute the registration of the replacement reservation task, and the process of FIG. 8 ends.

In S704, the task management unit 302 stores the task information as a replacement reservation task of the device search task. The information stored here refers to the task information 601 shown in FIG. 7. By the above process, the contract device that is a target for replacement can be specified and registered as a replacement reservation task.

Execution Processing for Device Search Task

Figure 9:
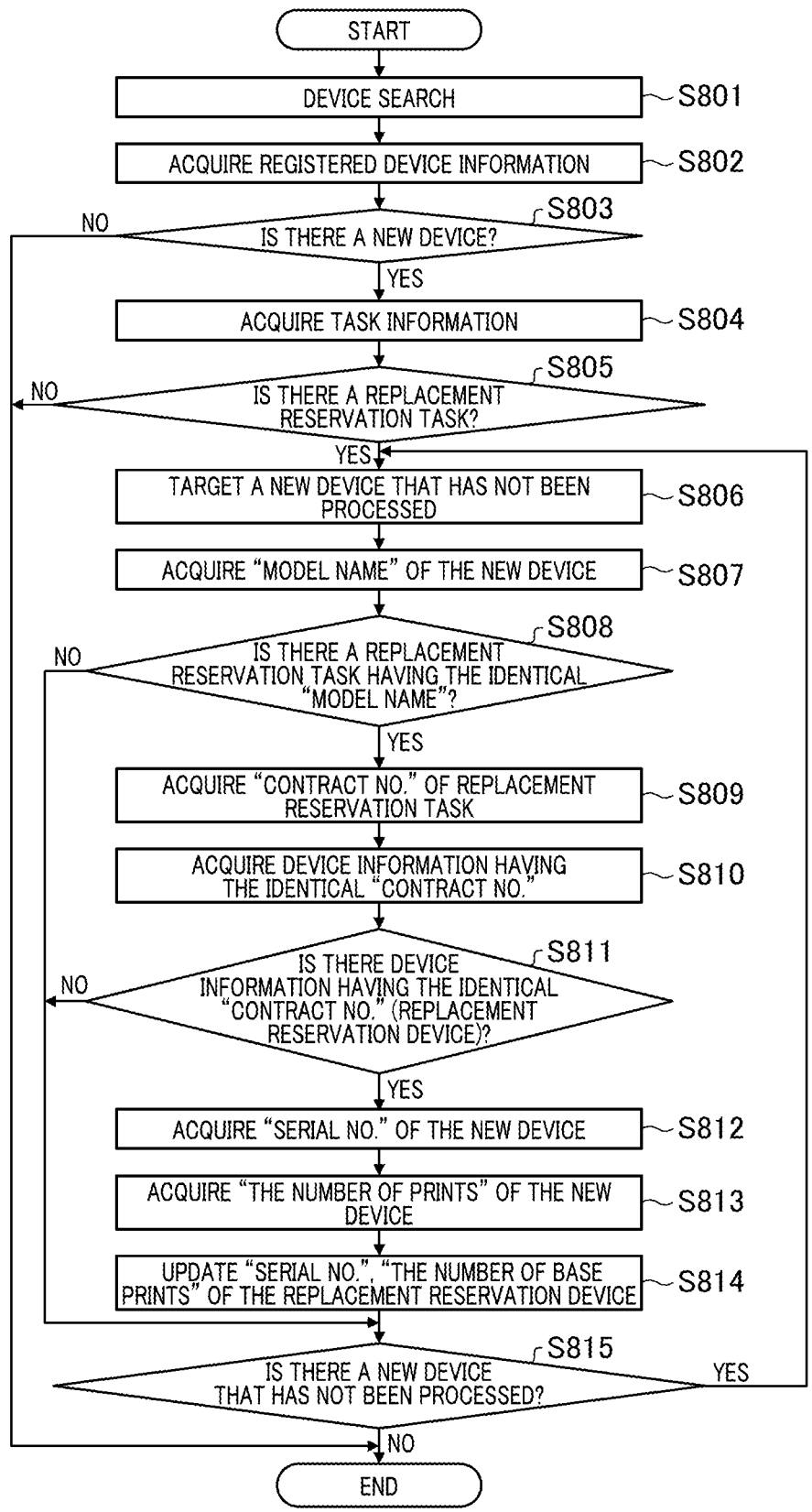
FIG. 9 is a flowchart illustrating an example of the execution processing procedure of a device search task according to the first embodiment of the present invention.

FIG. 9 is a flowchart illustrating an example of the execution processing procedure of the device search task of the device management application 300. Upon the start of the device management application 300 or upon the receipt of the operation for device search execution (not illustrated) by the user on the GUI 400 (not illustrated), the process starts. In the process, the user's operation to the screen display unit 305 is received by the input unit 304, and a process starts by the device search unit 303. The process described in the present embodiment is performed by loading the program of the device management application 300 stored in the ROM 204 or the external memory 206 into the RAM 203 and executing the program by the CPU 201.

In S801, the device search unit 303 executes a device search. The information acquired from the device during a search is a serial number, the model name, the number a printed sheets, and the IP address, of the device. Here, the serial number is the serial number 504 of FIG. 6. The model name is the model name 505 of FIG. 6. The number of printed sheets is the number of base prints 506 of FIG. 6. The IP address is the IP address 508 of FIG. 6.

In S802, the device search unit 303 instructs the device management unit 301 to acquire the registered device information. The device management unit 301 reads the device information 501 and returns the device list 502.

In S803, the device search unit 303 checks whether or not a new device has been searched. As a result of comparing the devices searched by the device search in S801 with a list of registered devices acquired in S802, among the searched devices, a device that does not exist in the list of registered devices is regarded as a new device. The serial number of the device is used for the comparison of the devices, and the devices having the matched serial number are regarded as the identical devices. If a new device is found as a result of a search, the process proceeds to S804, and if a new device is not found, the process of FIG. 9 terminates.

In S804, the device search unit 303 instructs the task management unit 302 to acquire the registered task information. The task management unit 302 reads the task information 601 and transfers it to the device search unit 303. When there is a plurality of items of task information 601, the task management unit 302 reads each item of task information 601 and transfers them to the device search unit 303.

In S805, the device search unit 303 checks whether or not the replacement reservation task exists in the task information 601 acquired in S804. Specifically, the device search unit 303 refers to the processing type 606 of the task information 601, and when the processing type 606 is "1", which indicates replacement reservation, the task is regarded as a replacement reservation task.

In S806, the device search unit 303 sets a device that has not yet been processed as a new device in S803 as a target for processing.

In S807, the device search unit 303 acquires the model name of the new device. The device search unit 303 refers to the value of the attribute specified by the filter attribute 604 of the task information 601 within the device information acquired during device search in S801. That is, when "1", which indicates the attribute of the model name, is specified in the filter attribute 604, the device search unit 303 refers to the model name of the device information. Instead of acquiring the model name during device search, the device search unit 303 may query the device in acquire the model name at this timing. The device search unit 303 is an example of an acquisition unit in which, if a new device corresponding to the model managed as a contract device is detected by the search, information necessary for management as a contract device is acquired from the new device, according to the task, depending on the detection results. The device information is an example of information necessary for management as a contract device.

In S808, the device search unit 303 checks whether or not a task that matches the model name of the new device is registered in the replacement reservation task. Specifically, the device search unit 303 checks whether or not the ask information 601, in which the filter value 605 matches the model name of the device information that is a target for processing, exists in the task information 601 that has been regarded as the replacement reservation task in S805. If such a task information 601 exists, the device search unit 303 sets the task information 601 as a target for execution and the process proceeds to S809, and if not, the process proceeds to S815.

In S809, the device search unit 303 acquires the contract number 607 of the task information 601 that has been regarded as a target for execution in S808.

In S810 the device search unit 303 acquires the registered device information in which the contract number is matched. The device search unit 303 acquires device information 503 in which the contract number the device information 503 matches the contract number 607 that has been acquired in S809 from among registered device information has been acquired in S802.

In S811, if the device information 503 with a matching contract to number exists, the device search unit 303 sets the device information 503 as a replacement device, sets a device that is a processing target at the present new device to be replaced, and the process proceeds to S812. If the device information 503 in which contract number is matched does not exist, the process proceeds to S815.

In S812 the device search unit 303 refers to the serial number of the new device (device to be processed). In step 813, the device search unit 303 refers to the number of printed sheets of the new device (device to be processed). The device search unit 303 may be configured to query the device to acquire the number of printed sheets at this timing, instead of acquiring the number of printed sheets during device search. The number of printed sheets acquired from the new device by the device search unit 303 is an example of the number of printed sheets managed at the time of detection. In S814, the device search unit 303 updates the serial number 504 and the number of base prints 506 of the device information 503 that is a replacement target with the serial number acquired in step 812 and the number of prints acquired in S813. The device search unit 303 instructs the device management unit 301 to store the device information 503 that has been updated.

In S815, the device search unit 303 checks whether or not a device that has not been processed exists among the devices regarded as the new devices in S803, and it a device that has not been processed exists, the process returns to S806 and the processes following S806 are executed. If a device that has not been processed, does not exist among the devices that are regarded as the new devices in S803, the process of FIG. 9 ends.

By the above processes, if a new device is found in the device search and a replacement reservation task in which the model name matches the model name of the device has been registered, the device search unit 303 regards the device as a new device to be updated. The device search unit 303 incorporates the device information in the information about the contract device (serial number, the number of base printed sheets). Thus, the new device to replaced is detected and the information about the new device is incorporated into the information about the contract device that is a replacement target, and thereby the user can continuously confirm the information about the contract device.

Second Embodiment

In the first embodiment, the model name is specified as the filter condition of the replacement reservation task. However, it is also conceivable that a plurality of identical models is replaced at the same time, for example, when old devices are replaced all at once. In this case, in the configuration of the first embodiment, a plurality of replacement reservation tasks for the same model exists, and it is difficult to decide which tasks to perform.

In the second embodiments, such a case is considered. The user can specify the serial number of the new device when the replacement reservation task is registered, and the new device is determined by the serial number when the replacement reservation task is the present embodiment, only the differences with the first embodiment will be described. All the configurations and processes, if not otherwise specified, are the same as those, in the first embodiment.

GUI in Device Management Application

Figure 10:
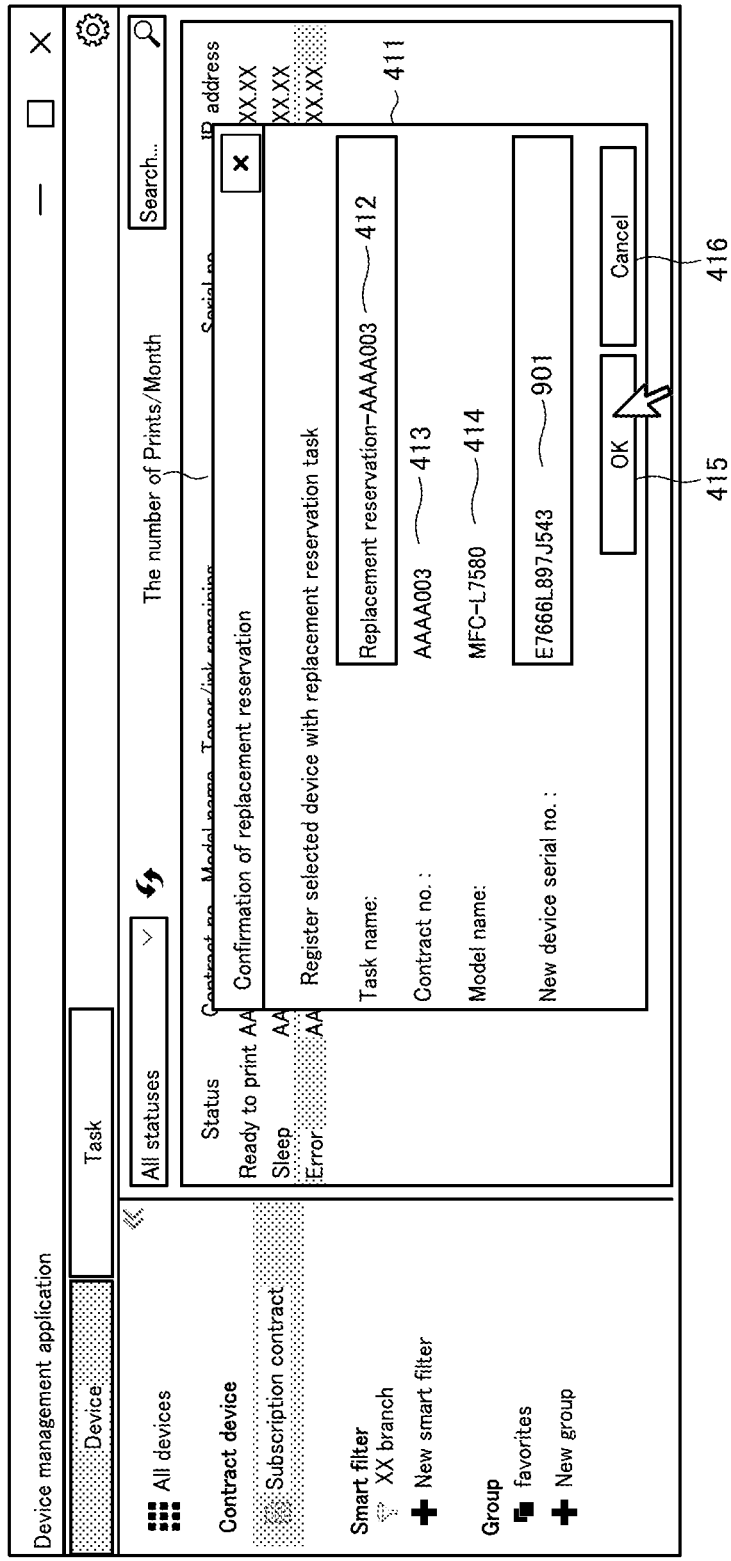
FIG. 10 illustrates an example of the GUI 400 of the device management application 300 according to the second embodiment of the present invention.

FIG. 10 illustrates an example of the GUI 400 of the device management application 300 in the second embodiment. In the present embodiment, it is assumed that the serial number 901 of the new device to be replaced can be specified in the confirmation message 411 of the replacement reservation shown in FIG. 5A. The serial number is specified in the serial number 901 of the new device to be replaced, and the OK button 415 is activated to register the replacement reservation task. The configurations defined in FIG. 10, if not otherwise specified, are all the same as those in FIG. 4A, FIG. 4B, FIG. 5A and FIG. 5B.

Data Structure (Task)

Figure 11:
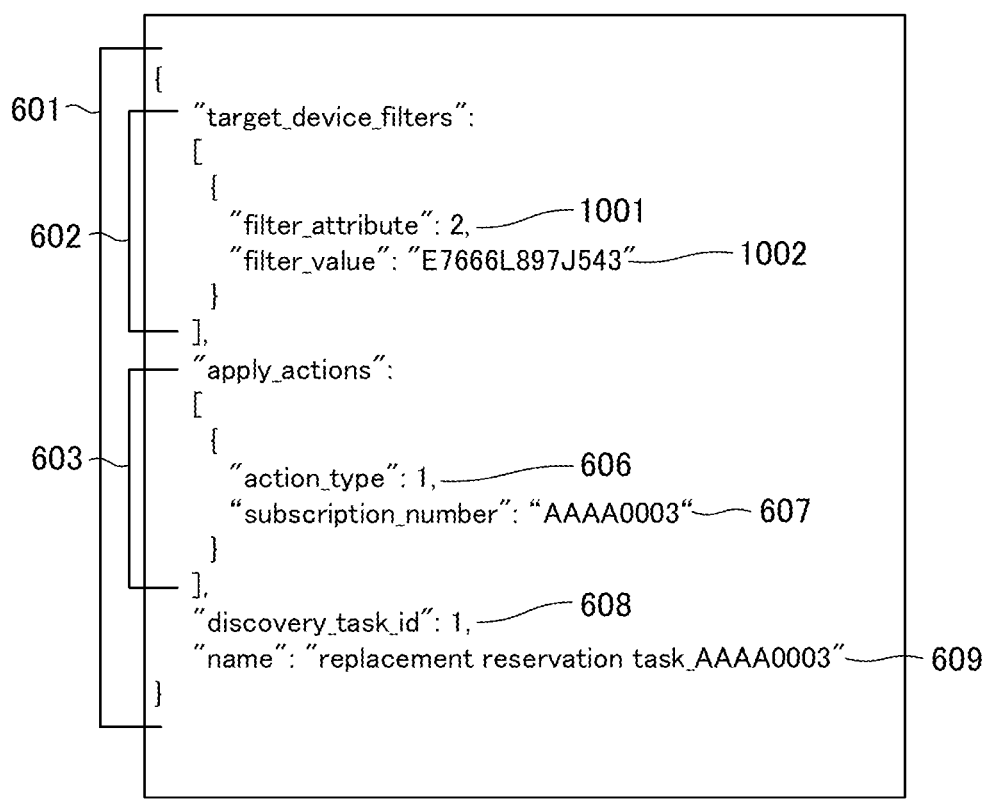
FIG. 11 illustrates an example of the data structure of the task information 601 according to the second embodiment of the present invention.

FIG. 11 illustrates an example of the data structure of the task information 601 managed by the device management application 300 in the second embodiment. Although FIG. 7 illustrates an example in which the model name is specified as the filter condition, in the second embodiment, the filter condition is specified by a serial number. Accordingly, a value "2", which indicates the serial number, is specified as a filter attribute 1001. Additionally, "E7666L897J543", which indicates the serial number of the new device to be replaced, is specified as a filter value 1002. Note that the configurations defined in FIG. 11, if not otherwise specified, are all the same as these FIG. 7.

Execution Processing for Device Search Task

Figure 12:
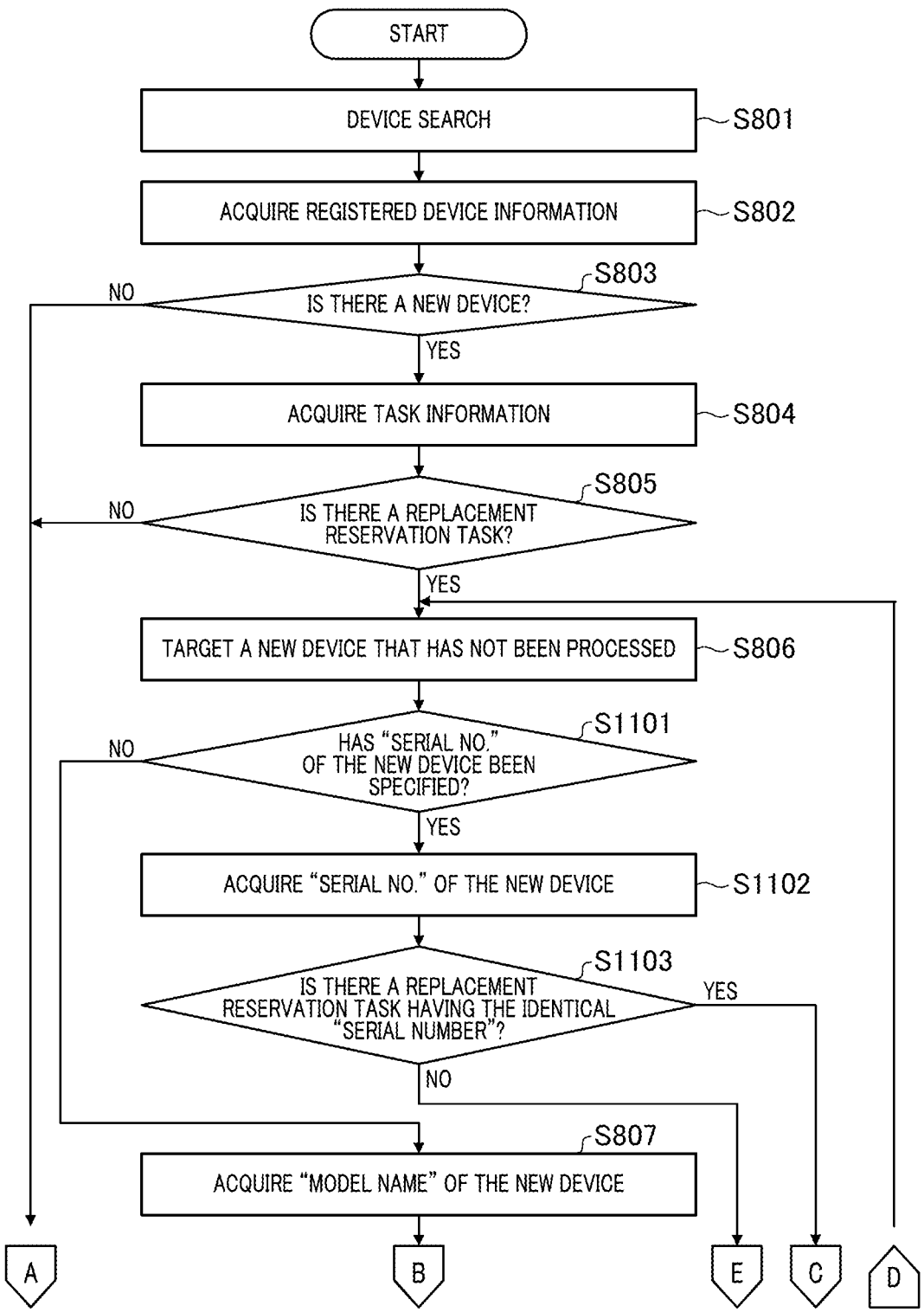
FIG. 12 is a flowchart illustrating an example of the execution processing procedure of the device search task according to the second embodiment of the present invention.
Figure 13:
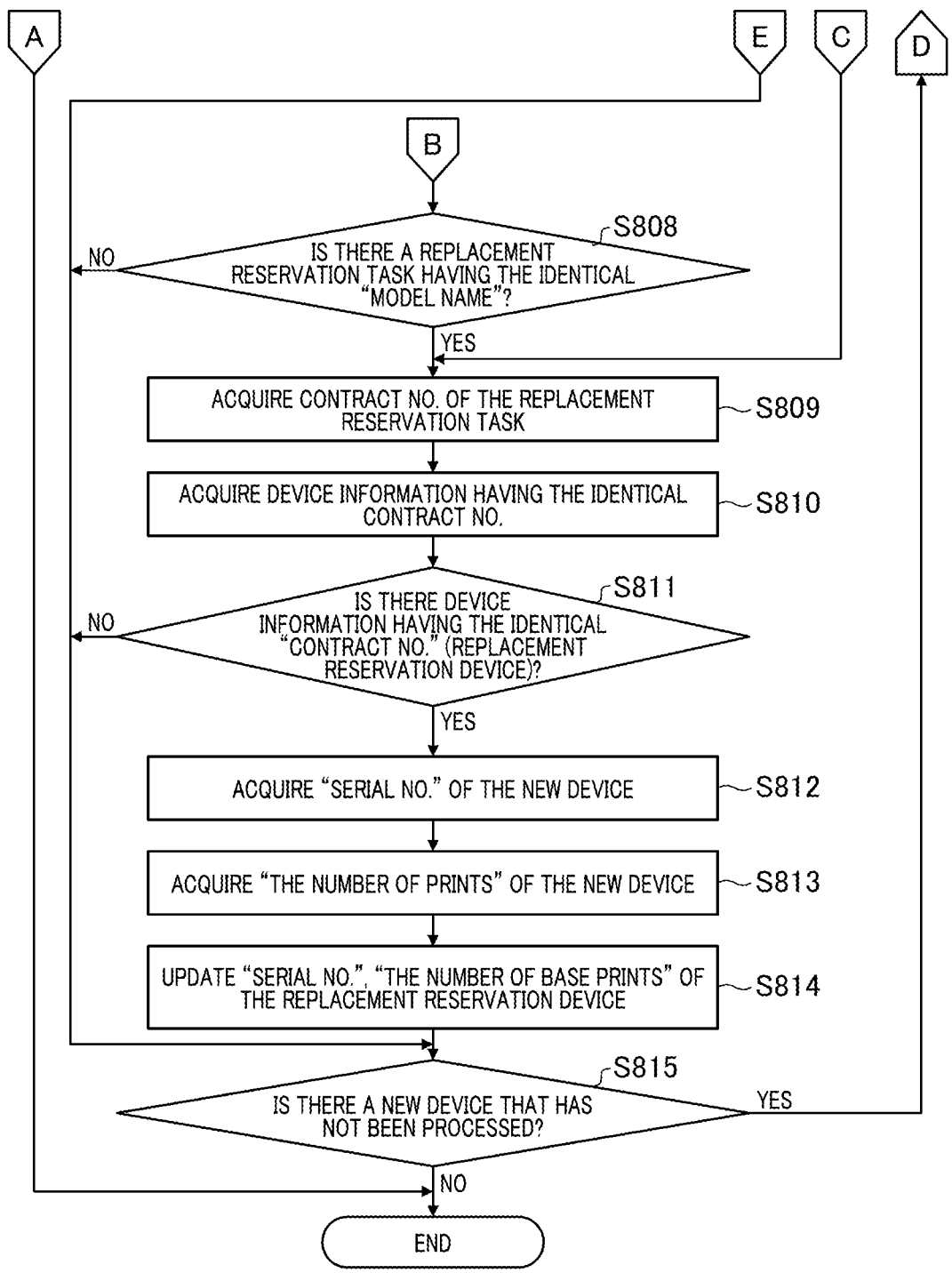
FIG. 13 is a flowchart illustrating an example of the execution processing procedure of the device search task according to the second embodiment of the present invention.

FIG. 12 and FIG. 13 are flowcharts illustrating an example of the execution processing procedure for the device search task device management application 300 in the second embodiment. FIG. 9 illustrates a process for determining a new device to be replaced by specifying the model name as a filter condition and determining the model name. Additionally, FIG. 12 and FIG. 13 illustrate an example of determining a new device by using the serial number when the serial number is specified. Note that the configurations defined in FIG. 12 and FIG. 13, if not otherwise specified, are all the same as those in FIG. 8. That is, the processes shown in FIG. 12 and FIG. 13, which are the same as those shown in FIG. 8, are denoted by the same reference numerals, and description thereof will be omitted.

In S806, the device search unit 303 sets a device that has not been processed as a target for processing from among devices set as the new devices in the processes from S801 to S803, and then executes the process in S1101.

In S1101, the device search unit 303 checks whether or not any of the task information 601 acquired in step 804 has a serial number specified as a filter condition. Whether or not the serial number is specified is determined depending on whether or not the serial number ("2") has been specified in the filter attribute 1001 with reference to the task information 601.

Here, if the device search unit 303 determines that the task information 601 in which the serial number has been specified exists, the process proceeds to S1102, and if the device search unit 303 determines such task information 601 does not exist, the process proceeds to S807, and the determination is performed by using the model name.

In S1102, the device search unit 303 acquires the serial number of the new device. The device search unit 303 refers to the value of the attribute specified by the filter attribute 604 of the task information 601 from among the device information acquired during device search in S801. That is, when "2", which indicates the attribute of the serial number, is specified, the device search unit 303 refers to the serial number of the device information.

In S1103, the device search unit 303 checks whether or not a replacement reservation task that matches the serial number of the new device exists. Specifically, the device search unit 303 checks whether or not a replacement reservation task in which the filter value 605 matches the serial number of the device information that is a target for processing, exists among the replacement reservation tasks regarded to specify the serial number in S1101. If such a replacement reservation task exists, the task information 601 is set as a target for execution and the process proceeds to S809, and if it does not exist, the process proceeds to S815.

As described above, even when a plurality of identical models is replaced at the same time, a new device that is a target for the replacement reservation task can be uniquely determined by specifying the serial number of the new device to serve as the filter condition of the replacement reservation task.

Third Embodiment

In the second embodiment, an example is described in which the serial number is specified as the filter condition of the replacement reservation task. Although this example assumes that the serial number of the new device to be replaced is already known as advance, there are cases in which the serial number is unknown. In the third embodiment, such a case is taken into consideration, and a replacement reservation task can be registered in advance even when the serial number is unknown. In the third embodiment, when there is a plurality of replacement reservation tasks (that is, contract devices for replacement destination) in which the conditions match the conditions of the new device found in the device search, the user is made to select a contract number of the target. In the present embodiment, only the difference with the second embodiment will be described. The configuration and processes, if not otherwise specified, are the same as those in the second embodiment.

GUI of Device Management Application

Figure 14A:
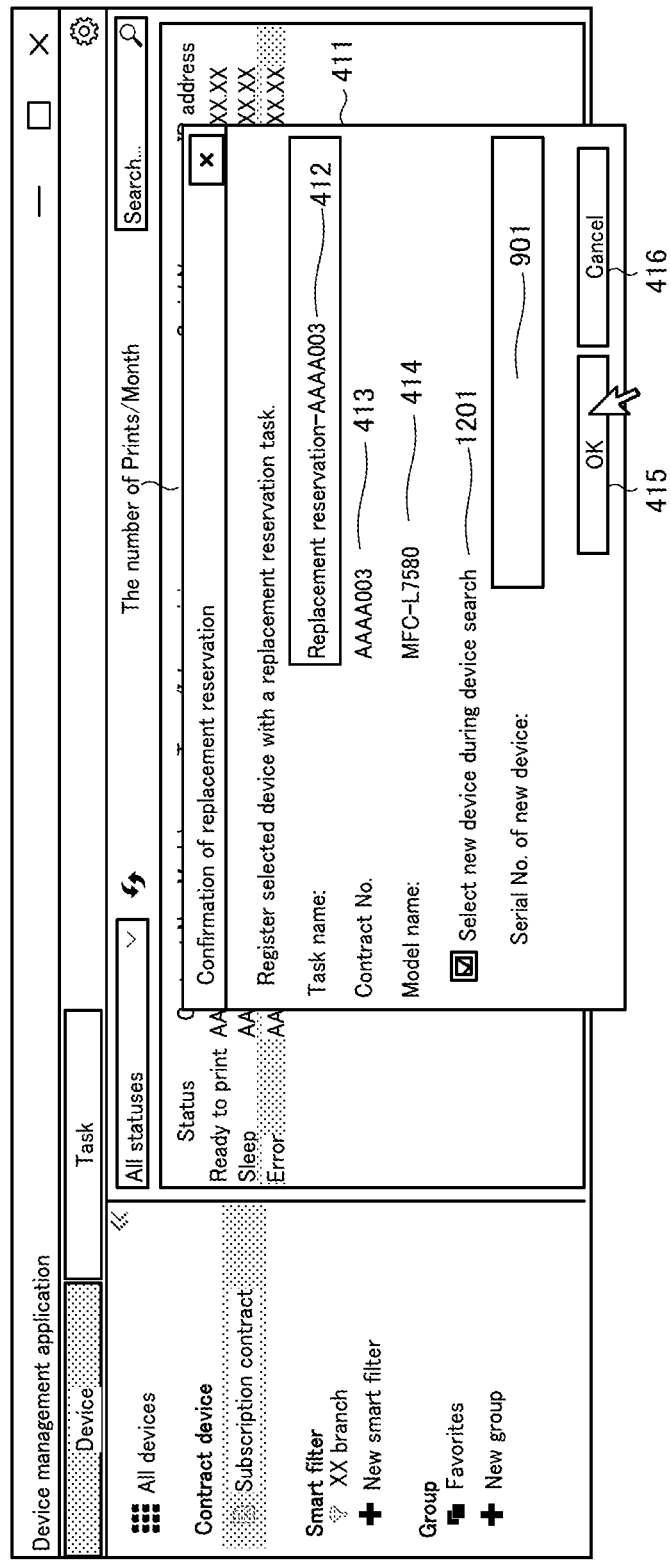
FIG. 14A and FIG. 14B illustrate an example of the GUI 400 of the device management application 300 according to the third embodiment of the present invention.
Figure 14B:
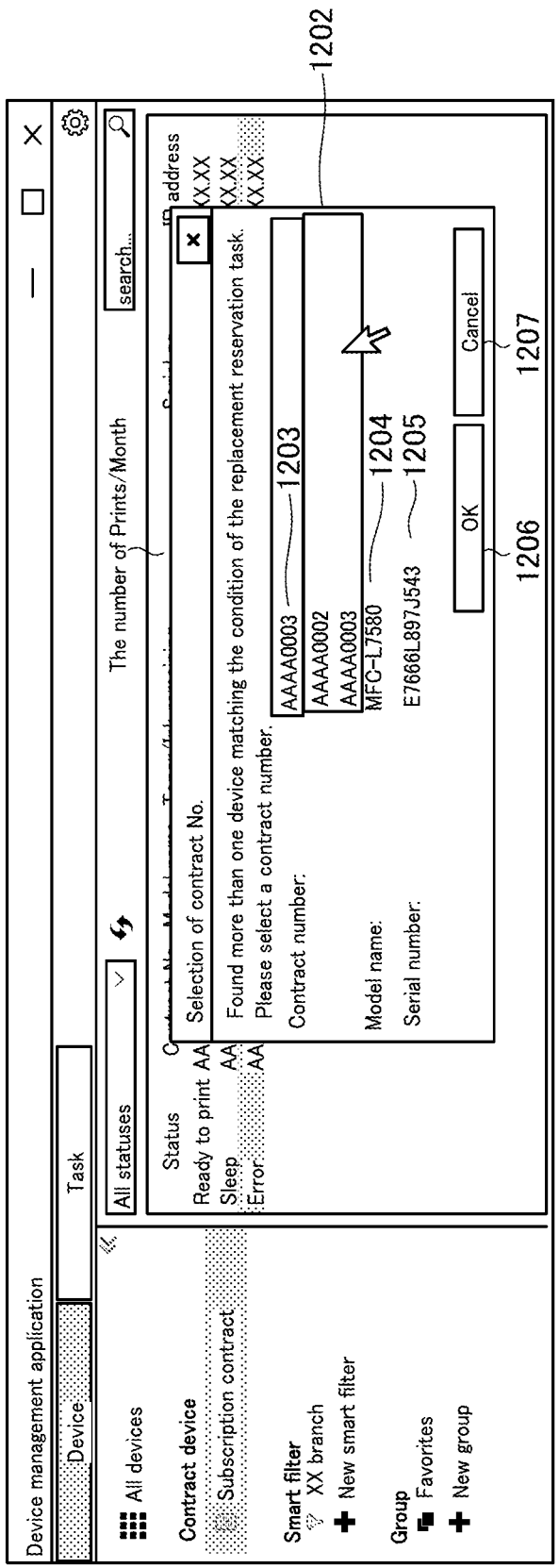

FIG. 14A and FIG. 14B illustrate an example of the GUI 400 of the device management application 300 in the third embodiment. In the present embodiment, in the confirmation message 411 of the replacement reservation shown in FIG. 5A, a check box 1201 for determining whether or not to select a new device during a device search is provided (refer to FIG. 14A). In the present embodiment, instead of specifying the serial number, the replacement reservation task can be registered by checking a check box 1201.

In the registration of the replacement reservation task by checking the check box 1201, instead of specifying a serial number as a filter condition of the task information, the replacement reservation task is registered by specifying a model name (filter attribute 604 and filter value 605 in FIG. 7). Thus, even when the serial number of the new device to be replaced is not known in advance, the replacement reservation task can be registered.

A screen 1202 of FIG. 14B is a screen for selecting a contract number, and when a plurality of replacement reservation tasks exists in which the condition matches the condition of the new device found in the device search, a contract device that is a contract destination of the new device is specified by selecting the contract number. The screen 1202, which is a screen for selecting a contract number, includes a contract number selection 1203 for specifying a target contract device, a model name 1204 of the new device, and a serial number 1205 of the new device. The device, management application 300 registers the replacement reservation task by executing an OK button 1206. The device management application 300 cancels the registration of the replacement reservation task by executing a cancel button 1207. The configurations defined in FIGS. 14A and 14B, if not otherwise specified, are all the same as those in FIG. 4A, FIG. 4B, FIG. 5A, FIG. 5B and FIG. 10.

Execution Processing of Device Search Task

Figure 15:
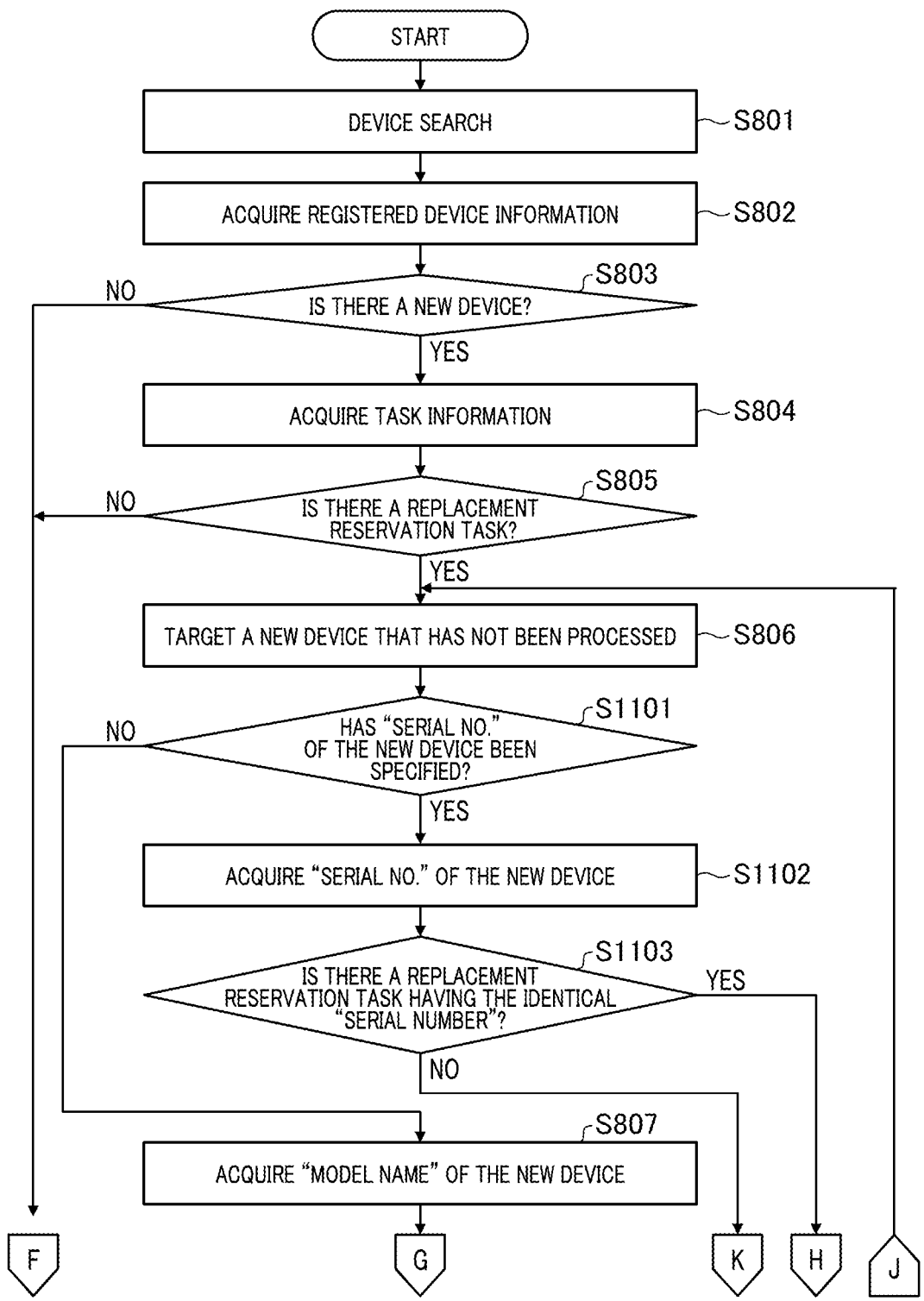
FIG. 15 is a flowchart illustrating an example of the execution processing procedure of the device search task according to the third embodiment of the present invention.
Figure 16:
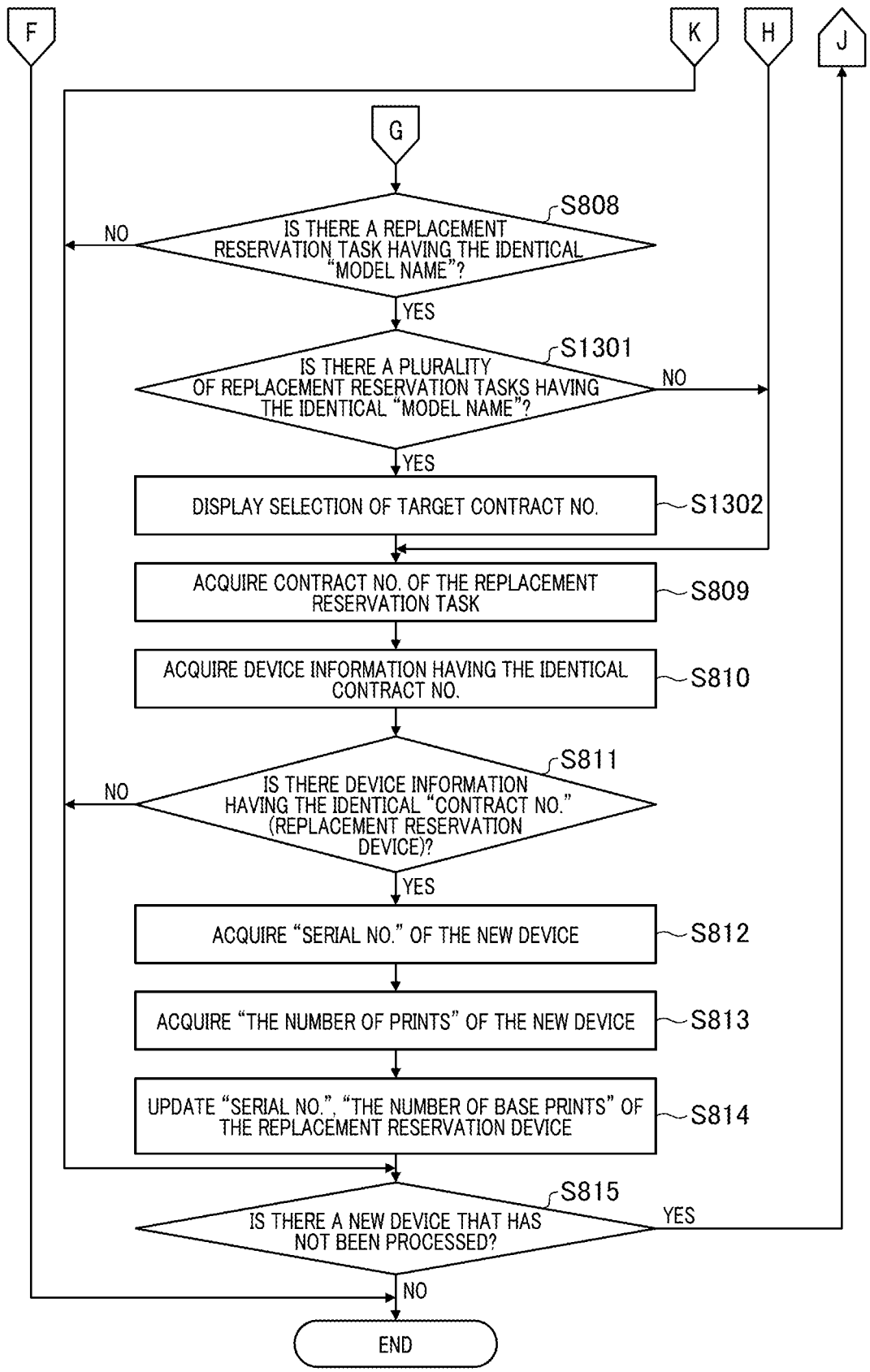
FIG. 16 is a flowchart illustrating an example of the execution processing procedure of the device search task according to the third embodiment of the present invention.

FIG. 15 and FIG. 16 are flowcharts illustrating an example of the execution processing procedure of the device search task of the device management application 300 in the third embodiment. FIG. 12 and FIG. 13 illustrate a process for determining a target device by specifying the serial number of the device to serve as a filter condition when a plurality of devices of the same model is replaced. FIG. 15 and FIG. 16 illustrate a process of displaying as screen for selecting a contract number and allowing the user to select a target when the individual device cannot be uniquely identified, for example, as with a serial number. The configurations defined in FIG. 15 and FIG. 16, if not otherwise specified, are all the same as those in FIG. 8, FIG. 12, and FIG. 13. That is, the processes of FIG. 15 and FIG. 16, which are the same as those in FIG. 8, FIG. 12, and FIG. 13, are denoted, by the same reference numerals, and the description thereof will be omitted.

In S1301, the device search unit 303 refers to the replacement reservation task determined to match the model name of the anew device in the process of S808, the process proceeds to S1302 when a plurality of corresponding tasks exists, and the process proceeds to S809 when a single task exists.

In S1302, the device search unit 303 instructs the screen display unit 305 to display the screen 1202 that is a screen for selecting a contract number. That is, the device search unit 303 specifies the contract numbers of the replacement reservation tasks in which the model navies are matched as a selection 1203 of the contract number. The device search unit 303 specifies the model name of the new device of the replacement reservation tasks in which the model names matched the model name 1204. The device search unit 303 specifies the serial numbers of the reservation tasks in which the model names are matched as the serial number 1205. The screen display unit 305 displays the screen 1202 based on these specifications. The device search unit 303 sets the replacement reservation task corresponding to the contract number selected by the user on the screen 1202 as a target for execution, at ad the process proceeds to S809.

Thus, even when the serial number is not known in advance, the replacement reservation task can be registered, and when a plurality of replacement reservation tasks exists in which the condition matches the condition of the new device, the replacement reservation task can be executed by allowing the user to select the target.

Other Embodiments

The present invention can also be implemented in the process of providing a program that implements one or more of the functions of the above-described embodiments to a system or device is a network or a storage medium, and reading and executing the program by one or more processors in a computer of the system or device. It can also be implemented by a circuit (for example, an ASIC) that implements one or more functions.

Although the preferred embodiments of the present invention have been described above, the present invention is not limited to these embodiments, and various modifications and variations are possible within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD) or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2020-117354, filed Jul. 7, 2020, which is hereby incorporated by reference herein in its entirety.

What is claimed is:

1. A device management apparatus comprising:
a memory storing instructions; and
a processor executing the instructions to:
  manage a network device capable of communicating via a network as a contract device for a subscription contract by using a contract number, a model, a device ID, and data for managing a total number of printed sheets for a term determined according to the subscription contract;
  generate a task for acquiring information necessary for management as the contract device from a new network device executed when the new network device corresponding to the subscription contract is detected;
  search a network device via a network;
  acquire information necessary for management as the contract device from the new network device according to the task if the new network device corresponding to a model managed as the contract device is detected by the search executed after the task was generated; and
  update and manage a device ID of the contract device and data for managing the total number of printed sheets for the term determined according to the subscription contract by using the information acquired from the new network device.

2. The device management apparatus according to claim 1,
wherein the processor further executes the instructions to acquire a number of printed sheets managed at the time of detection from the new network device, and update the data for managing the total number of printed sheets for the term determined according to the subscription contract.

3. The device management apparatus according to claim 1,
wherein the processor further executes the instructions to acquire information necessary for management as the contract device from a new network device according to the task, if the new network device corresponding to the device ID managed as the contract device is detected by the search.

4. The device management apparatus according to claim 1,
wherein the processor further executes the instructions to acquire information necessary for management as the contract device from a new network device according to a task corresponding to a selected contract number from among tasks corresponding to a detection if the new network device corresponding to a model managed as the contract device is detected by the search.

5. A method for controlling a device management apparatus comprising:
managing a network device capable of communicating via a network as a contract device for a subscription contract by using a contract number, a model, a device ID, and data for managing a total number of printed sheets for a term determined according to the subscription contract;
generating a task for acquiring information necessary for management as the contract device from a new network device executed when the new network device corresponding to the subscription contract is detected;
searching a network device via a network;
acquiring information necessary for management as the contract device from the new network device according to the task if the new network device corresponding to a model managed as the contract device is detected by the search executed after the task was generated; and
updating and managing a device ID of the contract device and data for managing the total number of printed sheets for the term determined according to the subscription contract by using the information acquired from the new network device.

6. The method according to claim 5, further including acquiring a number of printed sheets managed at the time of detection from the new network device and updating data for managing the total number of printed sheets for the term determined according to the subscription contract.

7. The method according to claim 5, further including acquiring information necessary for management as the contract device from the new network device according to the task, if the new network device corresponding to the device ID managed as the contract device is detected by the search.

8. The method according to claim 5, wherein if a new network device corresponding to a model managed as the contract device is detected by the search, the method further includes acquiring information necessary for managing as the contract device from the new network device according to a task corresponding to a selected contract number from among tasks in response to the detection.

9. A non-transitory storage medium on which is stored a computer program related to a method for controlling a device management apparatus, the method comprising:
managing a network device capable of communicating via a network as a contract device for a subscription contract by using a contract number, a model, a device ID, and data for managing a total number of printed sheets for a term determined according to the subscription contract;
generating a task for acquiring information necessary for management as the contract device from a new network device executed when the new network device corresponding to the subscription contract is detected;
searching a network device via a network;
acquiring information necessary for management as the contract device from the new network device according to the task if the new network device corresponding to a model managed as the contract device is detected by the search executed after the task was generated; and updating and managing a device ID of the contract device and data for managing the total number of printed sheets for the term determined according to the subscription contract by using the information acquired from the new network device.

* * * * *